United States Patent [19]

Serres et al.

[11] 4,263,482
[45] Apr. 21, 1981

[54] PUBLIC TELEPHONE STATION TRAFFIC ANALYZING ARRANGEMENT

[76] Inventors: Bernard M. Serres, 51, av. de la Paix, Fresnes, France, 94260; Maurice S. Viale, 174, Bd Jean Mermoz, Chevilly-la-rue, France, 94150; Edouard J. Jewiarz, 13, route de l'Abbaye, Gif-sur-Yvette, France, 91160

[21] Appl. No.: 20,188

[22] Filed: Mar. 13, 1979

[30] Foreign Application Priority Data

Mar. 14, 1978 [FR] France .................. 78 07329

[51] Int. Cl.³ ............................................. H04M 3/24
[52] U.S. Cl. ............................ 179/6.3 R; 179/8 R; 179/7 R
[58] Field of Search .............. 179/6.3 R, 6.5, 7 R, 179/7 MM, 7.1 R, 7.1 TP, 8 R, 8 A, 175.2 C, 175.3 R

[56] References Cited

U.S. PATENT DOCUMENTS

| | | | |
|---|---|---|---|
| 3,760,105 | 9/1973 | Puccini | 179/8 A |
| 3,829,618 | 8/1974 | Brandon | 179/8 A |
| 4,039,768 | 8/1977 | O'Maley | 179/6.3 R |
| 4,085,293 | 4/1978 | Karras | 179/8 A |
| 4,103,149 | 7/1978 | Linden | et al./179 |
| 4,124,774 | 11/1978 | Zarouni | 179/6.3 R |
| 4,124,775 | 11/1978 | Zarouni | 179/6.3 R |
| 4,165,447 | 8/1979 | Bertoglio et al. | 179/7.1 R |

Primary Examiner—Gerald L. Brigance
Attorney, Agent, or Firm—Abraham A. Saffitz

[57] ABSTRACT

An arrangement for traffic analysing for public telephone stations which are served from a telephone exchange. The exchange transmits charging pulses to the telephone stations through telephone subscriber's lines, when calls are requested from the telephone stations. A charging pulse counter is accessed through a charging pulse detector when a call is made. The counter counts the number of detected charging pulses during an observation period allocated to the calling telephone station. An analysis initializing circuit includes time recording data delivering means for periodically reading-out the charging pulse number in the counter and for resetting the counter after the observation period. A traffic analyzing circuit is connected selectively to charging pulse counters and compares the charging pulse number of each counter to at least two predetermined charging pulse number values specific to the telephone station at the end of each observation period allocated to the telephone station. The traffic analysing circuit produces a coded signal which indicates the abnormal operation type of said telephone station when the charging pulse number is greater than one or less than the other of the predetermined charging pulse number values specific to the telephone station or when the charging pulse number is equal to zero in order to deduce whether the station is out of service.

5 Claims, 8 Drawing Figures

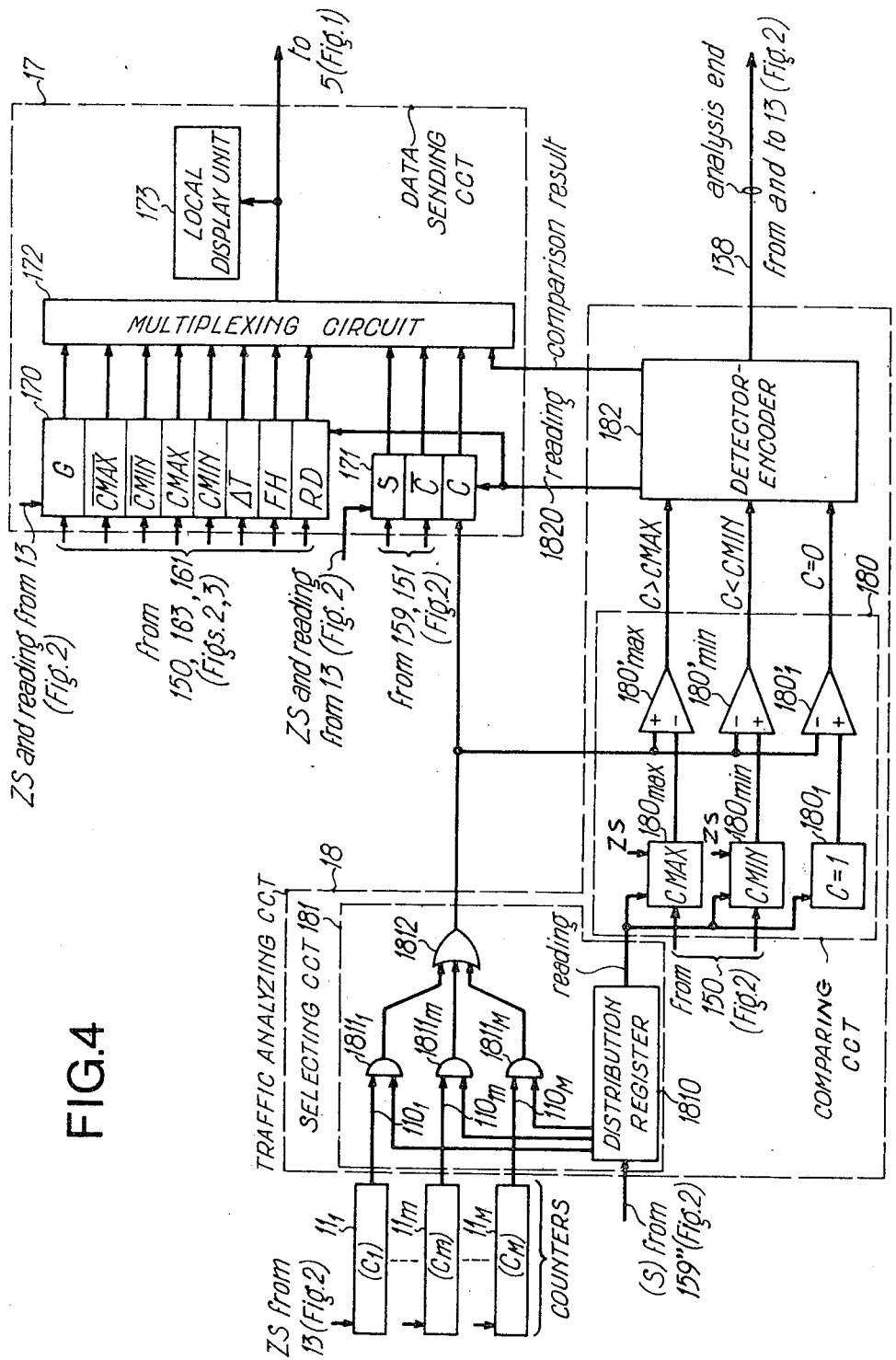

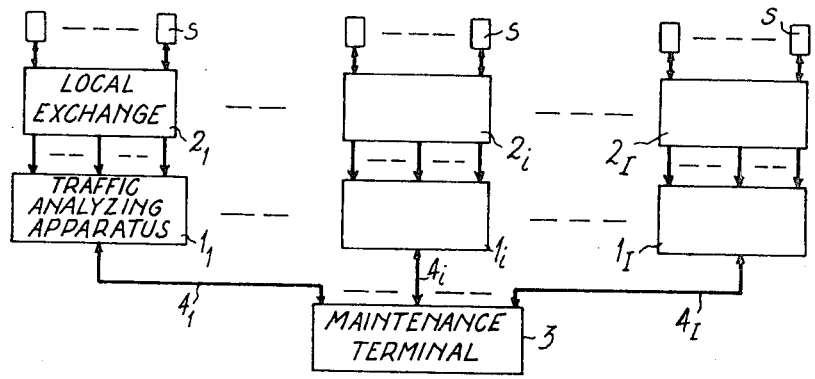
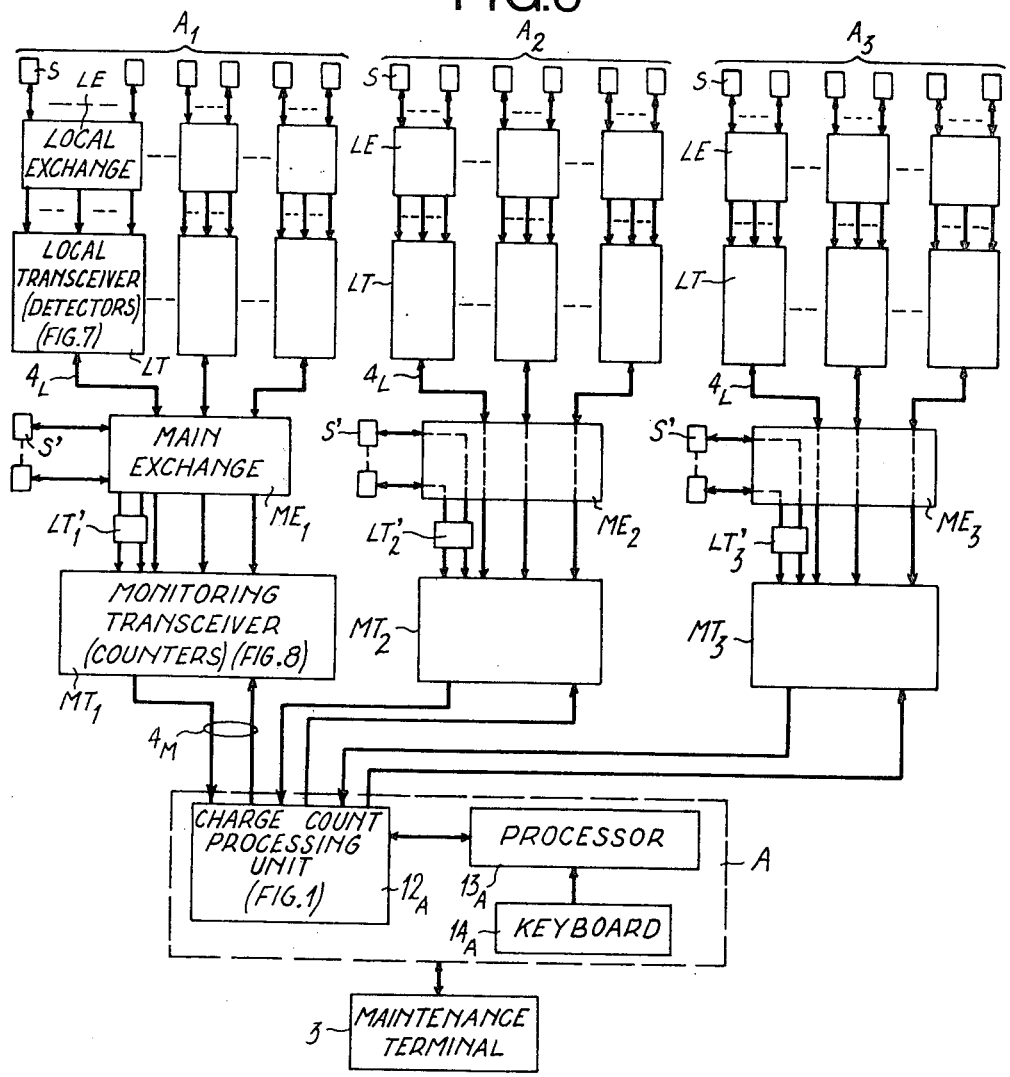

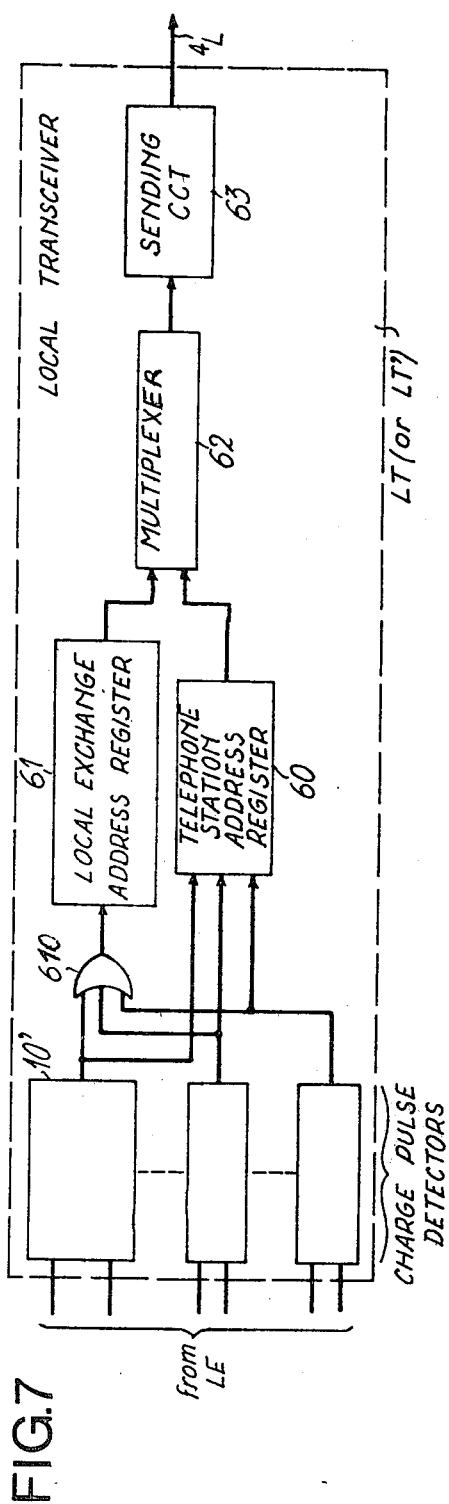

PUBLIC TELEPHONE STATION TRAFFIC ANALYZING ARRANGEMENT

CROSS REFERENCES TO RELATED APPLICATIONS

Applicants hereby make cross references to their French patent application PV 78 07329, filed Mar. 14, 1978 and claim priority thereunder following the provisions of 35 U.S.C. 119.

BACKGROUND OF THE INVENTION (a) Field of the invention

This invention relates to traffic analysis of public telephone stations. More particularly, it concerns an arrangement such as a traffic analysing apparatus or a remote surveillance system to analyse a number of public telephone stations which are served by a given number of telephone exchanges.

These public telephone stations or pay stations are generally placed in phone-boxes or telephone booths which are available to the public and are basically characterized by outgoing traffic. These public telephone stations are generally based on payment in advance or on payment by coin boxes.

(b) Description of the Prior Art

It may immediately be noted that the analysis of traffic of such telephone stations, according to the invention, is based on the interpretation and the recording of a number of charging pulses which are transmitted from the exchange to the telephone station after a communication is established from the station. This traffic analysing arrangement is not based, as are most known traffic analysing system, on observation of the supervisory signals transmitted from the telephone exchange when a communication is established in order to detect defects inherent in the operation of the intermediate circuits between the calling and the called telephone stations, such as trunks and telephone lines.

Information on public telephone stations which are broken down or out of order is at present given by users by means of the complaint call number at present in force or by the coin-box emptying personnel or by the personnel in the telephone exchange assigned to the public telephone stations. The fact that information on stations that are out of order is not immediate and is postponed in most cases for several days, contributes to maintaining a great number of these stations in a state of non-utilization and of faulty operation before the maintenance service is warned.

OBJECTS OF THE INVENTION

An object of this invention is to improve the monitoring of public telephone stations by supplying permanent or periodic information of their state of operation.

A further object of the invention is to provide an arrangement that analyses the traffic of a number of public telephone stations served by at least one telephone exchange and which provides for detecting anomalies of operation such as faulty encashment of coins or frauds on stations which are monitored.

SUMMARY OF THE INVENTION

According to the objects of the invention, there is provided a traffic analysing arrangement for public telephone stations which are served from a telephone exchange equipped to transmit charging pulses to said telephone stations through telephone subscriber's lines, said arrangement comprising:

means connected in parallel to each telephone line or directly to said telephone exchange for detecting charging pulses during telephone calls requested by the telephone station connected to said telephone line;

means connected to said charging pulses detecting means for periodically counting the number of detected charging pulses during a predetermined observation period allocated to said telephone station;

time recording data delivering means for periodically reading-out the charging pulse number in said counting means and for resetting said counting means after said predetermined observation period;

means connected selectively to said charging pulse counting means for comparing said charging pulse number to at least two predetermined charging pulse number values specific to said telephone station at the end of each predetermined observation period allocated to said telephone station; and coding means connected to said comparing means for producing a coded signal indicating the abnormal operation type of said telephone station when the charging pulse number is greater than one or less than the other of said predetermined charging pulse number values specific to said telephone station.

During the traffic analysis of each telephone station, the charge count is also compared with unity in order to deduce whether the station is out of service.

Analysis of the traffic of a telephone station in a booth is based, in accordance with the invention, on interpretation of the number of charging pulses which are received by the station and which is equal to that recorded by the charge meter at the exchange for a predetermined observation period $\Delta T$. This interpretation depends on general operation conditions of public telephone stations such as:

the traffic passing through a telephone station is relatively constant when operating normally and for a given environment, that is to say its average traffic intensity is constant; in the present invention the average traffic intensity of a telephone station is defined by the ratio of number of charging pulses which are transmitted from the telephone exchange to the telephone station during a great predetermined observation duration, to this observation duration;

traffic is nil when a telephone station is out of service; and traffic is either very low or very high when the telephone station is not functioning correctly.

By means of preliminary periodic observations lasting about 24 hours to 3 days during a duration of at least, for example, one month, effected by means of the traffic analysing apparatus embodying the invention, it is possible to determine minimum and maximum limits of charging pulse counts relative to each telephone station for a predetermined observation period $\Delta T$. A charging pulse count that lies between these limits indicates that the traffic of the telephone station is normal. This means that the average traffic intensity which characterises it is determined for each telephone station.

Based on these results, each telephone station is assigned to a charge count analysis group. Each group comprises a list of addresses of telephone stations of which the average traffic intensities lie between two predetermined average traffic intensity comparison limits and of which the charge counts are successively compared to two predetermined charge count comparison limits after each observation period of the group. After detection of the end of the observation period allotted to the group, the time recording means initializes a comparison of the charge count to the two charge count limits allotted to the group and to the unit. If the charge count lies between these two charge count limits, that is to say if the traffic of the telephone station is normal, no information is transmitted by the traffic analyser or, possibly, it transmits a "nothing to report" signal. On the other hand, if the charge count does not lie between these two charge count limits, the traffic analysing apparatus transmits a coded signal that indicates nil traffic, low traffic or high traffic, in addition to the address of the station and the charge count. It may also transmit at least one item of data relating to the address of the group to which the station is assigned, average traffic intensity of the station, certain data which define the group, the data and the end hour of each observation period. These signals are transmitted to a printer or a display console incorporated with the analysing apparatus and/or a data montoring and processing terminal of teleprinter type connected to the analysing apparatus by a special or conventional telephone channel of the telephone network.

The employees in the exchange interpret the results of the observations locally while, at a distance, the terminal provides automatic traffic analysis of telephone stations connected to several exchanges each of which possesses a traffic analysing apparatus embodying the invention.

In the event of remote monitoring of a great number of public telephone stations distributed over several geographic areas, for example rural areas and trunk areas, the analysing apparatus is connected directly to a terminal located at the telephone station maintenance centre and concentrates all the data. In the latter case, the charging pulses detecting means are connected to first, or local, telephone exchanges which serve the telephone stations and transmit the charging pulses in real time to secondary, or main, telephone exchanges to which are only connected the charging pulse counting means of which the transmission of charge counts is remote-controlled by the traffic analysing apparatus. This also contributes to reducing the costs of transporting maintenance teams and helps in localisation of telephone swindlers.

A traffic analysing apparatus embodying this invention includes advantageously means for changing the assignment of a public telephone station, at any moment, in relation to the station address lists of groups when average traffic intensity of a station is subject to change; this provides for taking account of the regular traffic evolution of each telephone station. The modifications carried out to the parameters of comparison and of allotment are based on the preceding observations in order not to give wrong information on telephone stations which are in good condition when they give evidence of traffic which is too low or too great after a certain number of observation periods. This results for example from wrong information on faulty operation of a telephone station which is repeated several times and followed by in-situ verification of its correct operation.

BRIEF DESCRIPTION OF THE DRAWINGS

Other features and advantages of this invention will become apparent from the following description of preferred embodiments of the invention as illustrated in the accompanying drawings in which:

FIG. 4 is a detailed block diagram of the traffic analysing circuit and of the data sending circuit included in the apparatus shown in FIG. 1;

FIG. 5 is a schematic block diagram of the organization of a traffic remote monitoring system comprising a plurality of apparatus in accordance with FIG. 1;

FIG. 6 is a schematic block diagram of the organization of traffic remote monitoring system in accordance with a second embodiment of the invention, designed to analyse traffic for a plurality of telephone stations which are distributed over areas very far away;

FIG. 7 is a schematic block diagram of a local transceiver which detects charging pulses and is included in the system shown in FIG. 6; and FIG. 8 is a schematic block diagram of a monitoring transceiver which counts charging pulses and is included in the system shown in FIG. 6.

DESCRIPTION OF THE PREFERRED EMBODIMENTS

Figure 1:
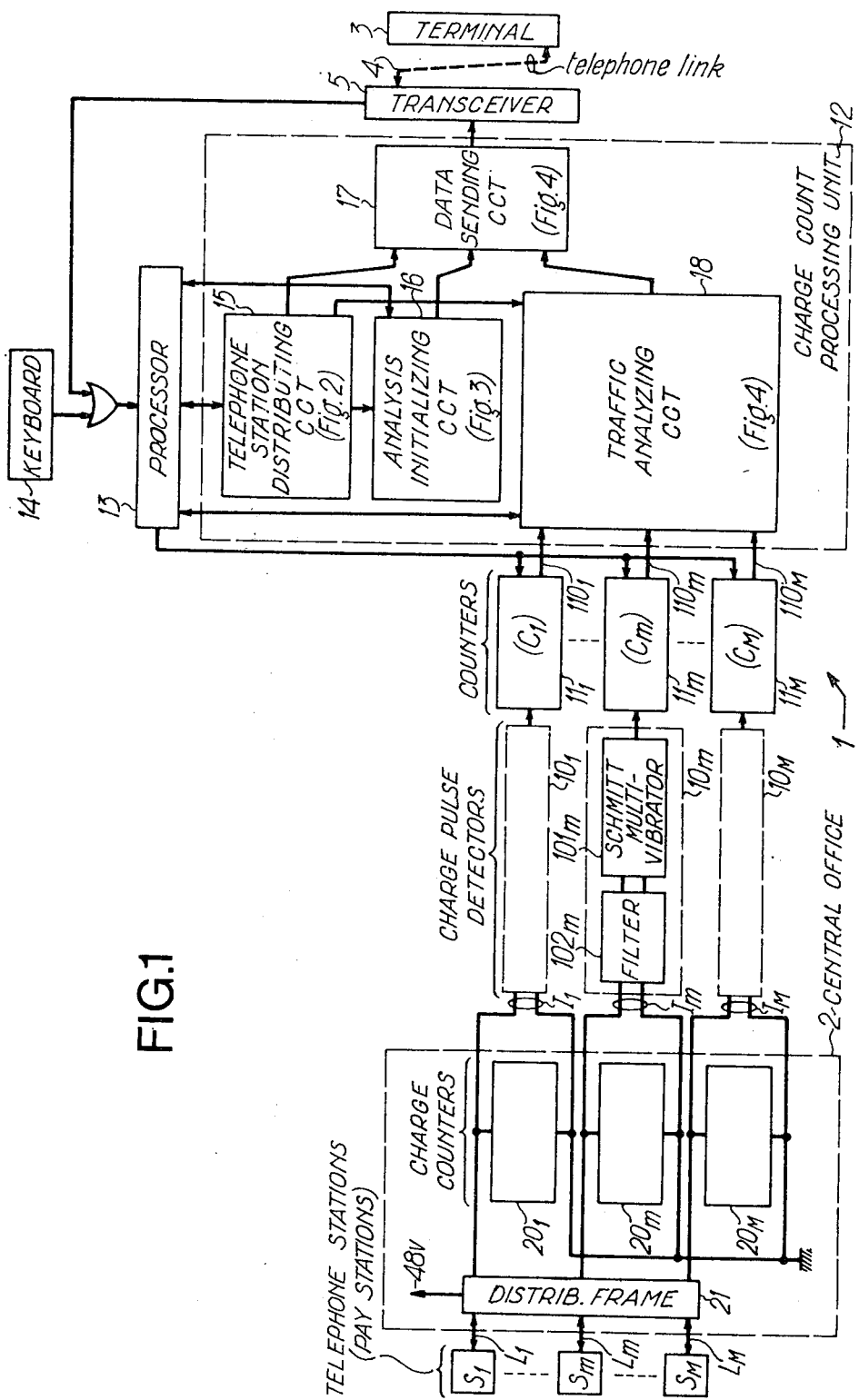
FIG. 1 is a schematic block diagram of traffic analysing arrangement which, in accordance with a first embodiment, is an apparatus that analyses the charge counts of telephone stations connected to a common telephone central office.

Following the first embodiment illustrated in FIG. 1, the traffic analysing arrangement takes the form of a portable apparatus 1 which is designed to analyse the traffic of M public telephone stations $S_1$ to $S_M$. The telephone stations such as pay stations are served through telephone subscribers' lines $L_1$ to $L_M$ from a common telephone central office 2. The pairs of input terminals $I_1$ to $I_M$ of the apparatus are connected in parallel to the terminals of the charge counters $20_1$ to $20_M$ of the exchange 2 which transmits the charging pulses to telephone stations $S_1$ and $S_M$ through distribution frame 21 of exchange 2. Each pair $I_1$ to $I_M$ has a wire connected to earth or to the reference voltage of exchange 2 and a wire connected to negative battery terminal of exchange 2 at −48 volts through the distribution frame 21. According to another mode of charging pulse transmission and exchange organization, certain pairs of charge wires $I_1$ to $I_M$ may be respectively connected to the wires of lines $L_1$ to $L_M$ which serve stations $S_1$ to $S_M$ respectively. In this last case, the charge counter of the exchange is deleted.

On the side that receives the charging pulses, the traffic analysing apparatus 1 comprises charge pulse detector $10_1$ to $10_M$, the inputs of which are connected to charge wire pairs $I_1$ to $I_M$ respectively and the outputs of which are connected to the inputs of charge counter $11_1$ to $11_M$. Each detector $10_1$ to $10_M$ is suited to the transmission characteristics of the charging pulses which are assigned to the associated public telephone stations $S_1$ to $S_M$, depending on whether the charging pulses are modulated to the carrier frequency of 12 kHz or to 50 Hz. A detector $10_m$, with m varying from 1 to M, comprises a Schmitt multivibrator 101 which turns the charging pulses into logic form. The charging pulses are received by a pass-band or a low-pass filter which is suited to the carrier frequency of the charging pulses and then are transmitted to the input of the counter $11_m$.

Figure 2:
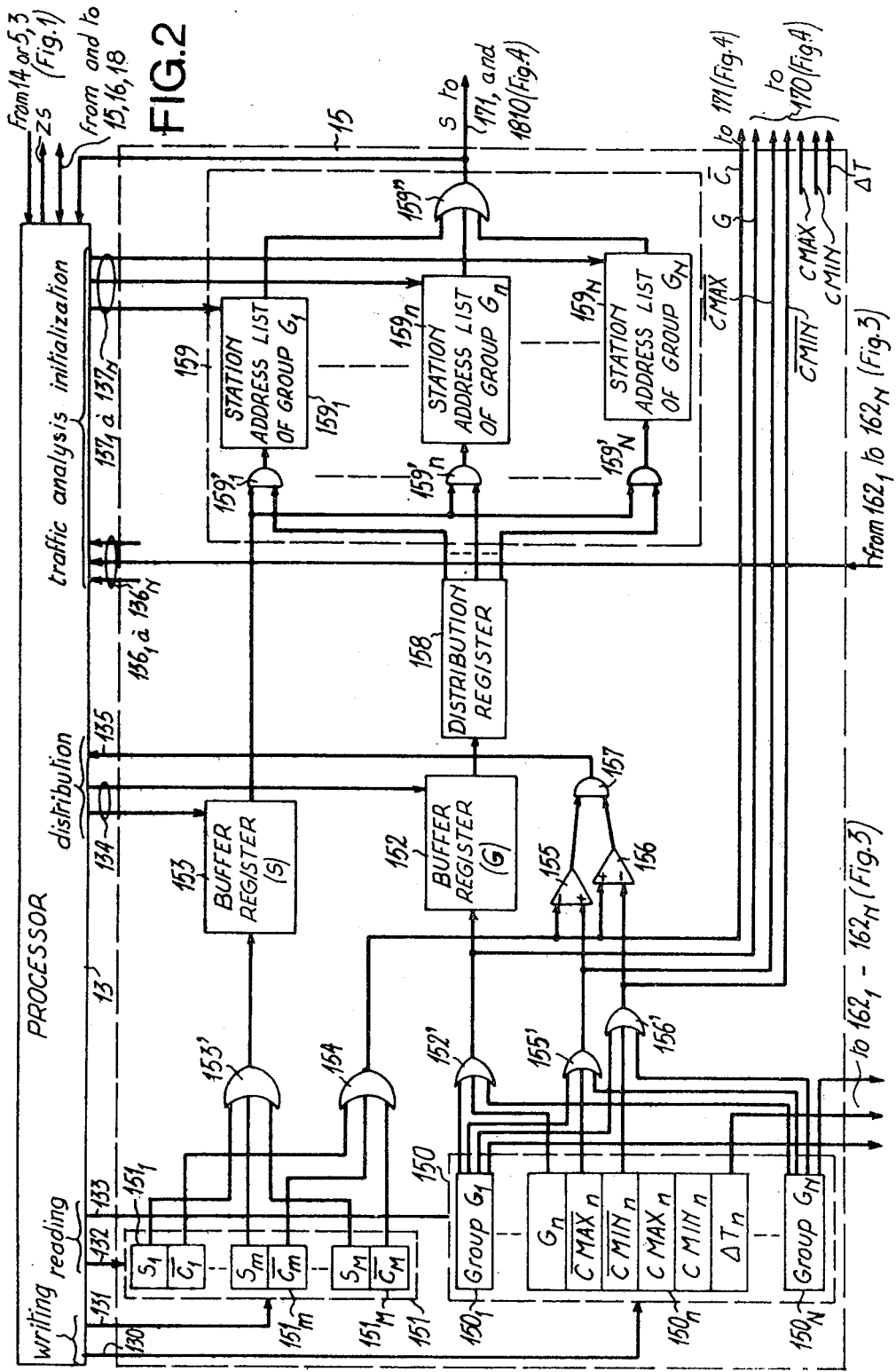
FIG. 2 is a detailed block diagram of the telephone station distributing circuit included in the apparatus shown in FIG. 1, for the purpose of allotting telephone stations in analysis groups.
Figure 3:
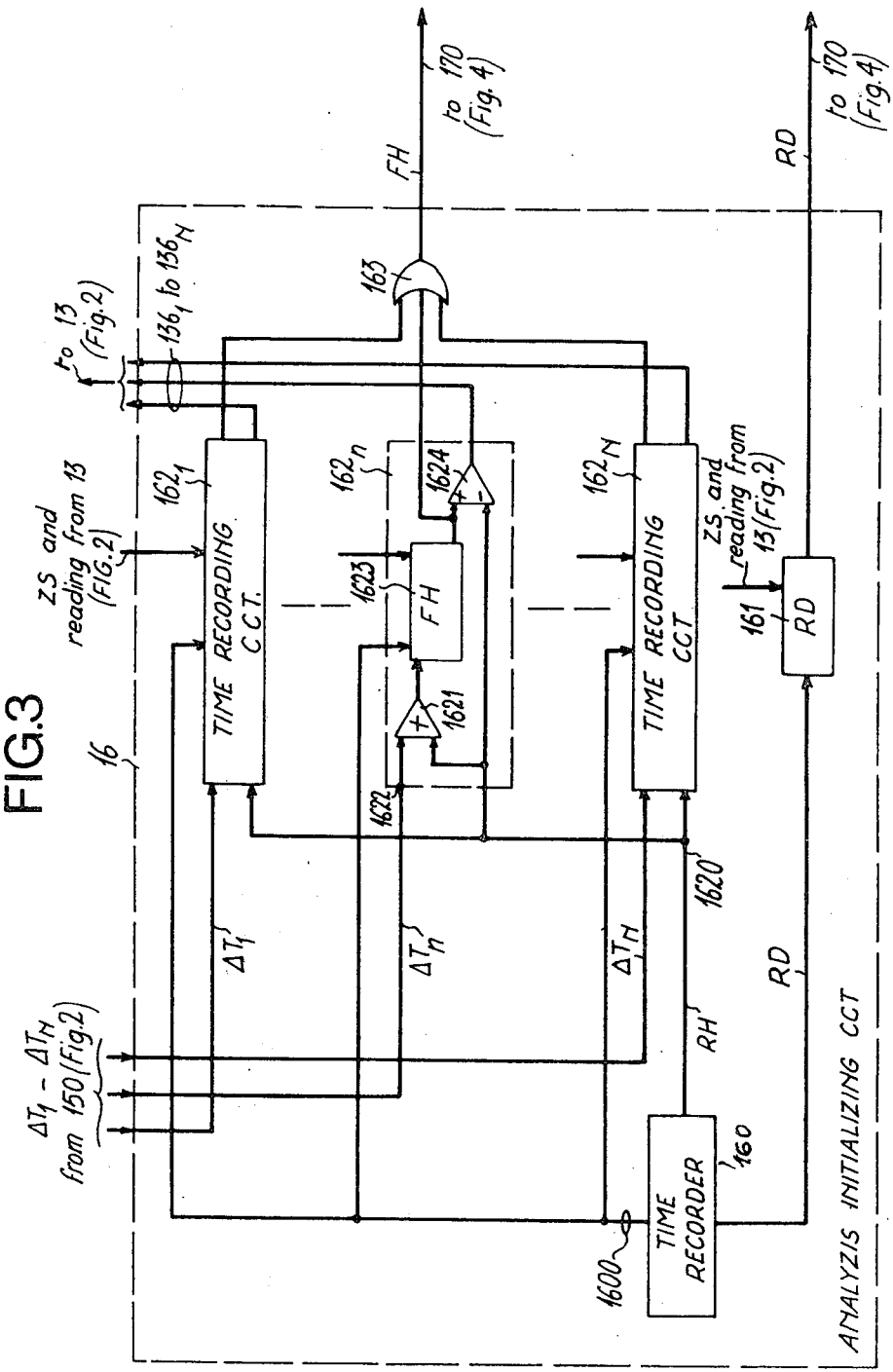
FIG. 3 is a detailed block diagram of the traffic analysis trigger circuit included in the apparatus shown in FIG. 1.

It may now be noted that, in FIG. 1 and the following FIGS. 2 to 4, the detailed structure is shown for the blocks that are assigned to a public telephone station $S_m$, with m varying from 1 to M, the other analog function blocks assigned to the other public telephone stations being identical, unless otherwise stipulated. The same applies to the blocks assigned to group $G_n$, with n varying from 1 to N, in relation to the other groups $G_1$ to $G_N$, as will be explained below.

The analysing apparatus 1 also comprises a charge count processing unit 12 which processes charge counts $C_1$ to $C_M$ transmitted by the outputs $110_1$ to $110_M$ of the charge counters $11_1$ to $11_M$. This processing unit 12 is controlled by a processor 13 such as a stored program computer, which is itself fed with data by an alphanumeric keyboard or codewheels and push-buttons 14 which are integrated into the apparatus in a similar way to a teleprinter. The processor 13 may also be fed with data by a remote monitoring and traffic management terminal 3. The terminal 3 is connected to the apparatus 1 through a bidirectional specialized telephone channel 4 or through a bidirectional conventional telephone channel of the telephone network and by means of a conventional telephone transceiver 5, the latter comprising modem suited to the transmission code of the channel 4.

The processing unit 12 comprises a public telephone station distributing circuit 15, an analysis triggering circuit 16 which triggers the charge count analysis for each station classification group $G_1$ to $G_N$, a data sending circuit 17 and a traffic analysing circuit 18 which analyses the charge count of each telephone station FIG. 2 shows in detail the telephone station distributing circuit 15 which provides for classification of telephone stations $S_1$ to $S_M$. It is assumed that traffic analysis is carried out for N classification groups $G_1$ to $G_N$, with $N < M$. Each group $G_n$, with n varying from 1 to N, is defined by an average traffic intensity range, $\overline{CMIN}_n$ to $\overline{CMAX}_n$, taken over 24 hours, for example, and by an observation period $\Delta T_n$. The ranges ($\overline{CMIN}_1$, $\overline{CMAX}_1$) to ($\overline{CMIN}_N$, $\overline{CMAX}_N$) of groups $G_1$ to $G_N$ evidently have common limits, two by two, in order to cover all the average traffic intensities $\overline{C}_1$ to $\overline{C}_M$ of telephone stations $S_1$ to $S_M$. These average traffic intensities are established during a preliminary traffic study of the telephone stations for a fairly long observation period, such as one month.

When the apparatus 1 in first put into service, each telephone station $S_1$ to $S_M$ is assigned to a classification group $G_1$ to $G_N$ as a function of value $\overline{C}_1$ to $\overline{C}_M$, on an order given by keyboard 14 or terminal 3. For this purpose, the processor 13 writes through the bus 130 the characteristics that define each group $G_1$ to $G_N$ in one of at least N memory cell blocks $150_1$ to $150_N$ of a group memory 150. The characteristics relating to a group $G_n$ are the address $G_n$ of the group, the two average traffic intensity comparison limits $\overline{CMIN}_n$ and $\overline{CMAX}_n$, the observation time $\Delta T_n$ and the two charge count comparison limits $CMIN_n$ and $CMAX_n$ to which are compared the charge count C counted during the predetermined observation time $\Delta T_n$ and related to the stations assigned to group $G_n$. Each address $S_1$ to $S_M$ of telephone station is written through the bus 131 by the processor 13 in one at least of M memory cell blocks $151_1$ to $151_M$ of a station memory 151 as well as the average traffic intensity $\overline{C}_1$ to $\overline{C}_M$ of the station.

The operator then triggers a phase that distributes public telephone stations in the groups. This phase is composed of M cyclic sequences. At the start of the distribution sequence of a station such as $S_m$, the processor 13 orders through buses 132 and 133 the reading of the address of the first group $G_1$ and of the address $S_m$ of the station, which are transferred through two OR-gates 152' and 153' into two buffer registers 152 and 153, respectively. The processor 13 then reads average intensity $\overline{C}_m$ of station $S_m$ which is transmitted through an OR-gate 154 to the inverse (−) and direct (+) inputs of two comparators 155 and 156, and reads the average traffic intensity limits $\overline{CMIN}_1$ and $\overline{CMAX}_1$ of the first group $G_1$ at the same time, which are transmitted through two OR-gates 155' and 156' to the direct (+) and inverse (−) inputs of comparators 155 and 156. If $\overline{CMIN}_1 \leq \overline{C}_m < \overline{CMAX}_1$ the outputs of comparators 155 and 156 are in state "1." This indicates to the processor 13 through an AND-gate 157 and a wire 135 that the station $S_m$ must be classed in the first classification group $G_1$. In this case, the processor 13 orders via a bus 134 the reading of the group address $G_1$ which is transmitted from the buffer register 152 to a distribution register 158. The register 158 relates a memory block of the station address list $159_1$ to $159_N$ of a memory 159 to each group address $G_1$ to $G_N$. Each memory block $159_1$ to $159_N$ comprises at least M memory cells suitable for recording the addresses of stations of which the average intensity value $\overline{C}$ lies between the average intensity limits of the associated group $G_1$ to $G_N$. In the present case, the distribution register 158 opens the AND-gate $159_1'$ of N AND-gates $159_1'$ to $159_N'$ connected to blocks $159_1$ to $159_N$ so as to transfer the station address $S_m$ contained in the register 153 into an empty memory cell of the block $159_1$. If $\overline{C}_m \geq \overline{CMAX}_1$ or $\overline{C}_m < \overline{CMIN}_1$, the processor 13 orders the comparison of $\overline{C}_m$ with the average traffic intensity values relating to the following groups $G_2$ to $G_N$ in accordance with the previous subsequence until the comparators 155 and 156 detect a range of average traffic intensities to which the value $\overline{C}_m$ belongs.

All the other public telephone stations are then distributed in the groups in a similar manner to the above sequence. At the end of the distribution phase, each memory block $159_1$ to $159_N$ contains a number of telephone station addresses which are generally different from those contained in the others. Thus during traffic analysis itself, each telephone station $S_1$ to $S_M$ is analysed as a function of its average traffic intensity $\overline{C}_1$ to $\overline{C}_M$ by comparison of the limiting values $\overline{CMIN}$ and $\overline{CMAX}$ of the group to which it belongs with its charge count $C_1$ to $C_M$ estimated after each observation period $\Delta T$ of the group. After each observation period $\Delta T$ of the same group, the telephone stations of the group are analysed successively.

As shown in detail in FIG. 3, the analysis triggering circuit 16 triggers the analysis of charge counts $C_1$ to $C_M$ recorded in the counters $11_1$ to $11_M$. The circuit 16 comprises a time recorder 160, a date register 161 which receives the relative date RD (month and day) from the time recorder 160 and N time recording circuits $162_1$ to $162_N$, the common inputs 1620 of which receive the relative hour RH transmitted by the time recorder 160. All the time recording circuits are identical and only one $162_n$ associated with the group $G_n$ is shown in detail in FIG. 3.

A time recording circuit 162 comprises an adding circuit 1621 having an input 1620 which receives relative hour RH transmitted by the time recorder 160. Another input 1622 of the adding circuit 1621 receives the observation time $\Delta T$ which is transmitted by the cell of the memory block 150 associated to the group, by order for reading given by the processor 13 when traffic analysis is started or after the analysis end of the telephone stations assigned to the group in question. The result of adding RH+$\alpha$T is equal to the hour FH at the end of the observation period which is memorized in a register 1623. During the observation period, the block of the time recorder 160 periodically orders reading of the register 1622, for example every minute, via a wire 1600. The relative hour RH is transmitted by the time recorder 160 to the inverse (−) input of a comparator 1624 and is compared periodically with the final hour FH transmitted to the direct (+) input of the comparator 1624 from the output of the register 1623. When FH=RH, the output of the comparator 1624 transmits a signal indicating the end of the observation period on the associated output wire $136_1$ to $136_N$ to the processor 13 in order to initiate the analysis of charge counts of the public telephone stations assigned to the group in question. If two or more groups have to be analysed at the same time at the end of the observation period, the processor 13 draws up a predetermined priority of analysis of these groups.

The processor 13 after receiving an initiating signal on one of wires $136_1$ to $136_N$, for example wire $136_n$, passes to the analysis phase of the group $G_n$. It orders via the bus 130 the transfer of address $G_n$ through OR-gate 152' and of one or more characteristics such as $\overline{CMIN}_n$, $\overline{CMAX}_n$, $CMIN_n$, $CMAX_n$ and $\Delta T_n$ that define the group $G_n$, through OR-gates 155', 156' and others gates not shown, to buffer memory 170 of data sending circuit 17 shown in FIG. 4, for them to be printed and/or displayed later. Simultaneously, the processor 13 orders the transfer of the final hour FH from the register $1623_n$ via an OR-gate 163 and of the relative data RD from the register 161 to the memory 170 and orders transfer of the charge count comparison limits $CMAX_n$ and $CMIN_n$ from the memory block $150_n$ to two buffer memories $180_{max}$ and $180_{min}$ of the traffic analysis circuit 18.

As shown in FIG. 4, the traffic analysing circuit 18 comprises a charge count comparing circuit 180, a counter selecting circuit 181 and a detector-encoder 182. The traffic analysing circuit 18 is used every time that a charge count C of a station is to be analysed. During the analysis phase of stations assigned to group $G_n$, for example, identical analysis sequences, of the same number as that of the addresses of the station memorized in the list memory block $159_n$, are successively ordered by the processor 13. Each analysis sequence of a station of the group $G_n$ is initialized by the reading of its address in the block $159_n$ via a bus $137_n$. This telephone station address is transmitted through OR-gate 159" shown in FIG. 2 to one of the three cells of a buffer memory 171 included in the data sending circuit 17 and to a distribution register 1810 of counter selecting circuit 181. The address may also be transmitted to the processor 13 so that the processor may order transfer of the value $\overline{C}$ of the station from the associated memory block 151 into one of the cells of the buffer memory 171.

Each time the distribution register 1810 receives a telephone station address, it opens a corresponding AND-gate $1811_1$ to $1811_M$ of the counter selecting circuit 181 of which the other input is connected to the output $110_1$ to $110_M$ of the counter $11_1$ to $11_M$ associated with the addressed station. The count C is recorded in the three cells of the buffer memory 171 through the corresponding AND-gate 1811 and an OR-gate 1812, and is also transmitted to the direct (+) input of a comparator $180_{max}'$, to the inverse (−) input of a comparator $180_{min}'$ and to the inverse (−) input of a comparator $180_1'$. The other inputs of the three comparators $180_{min}'$, $180_{max}'$ and $180_1'$ in the comparating circuit 180 are connected respectively to the outputs of the buffer memories $180_{max}$, $180_{min}$ and of a read-only memory $180_1$ in which the value of charge count C=1 is stored.

Each time that the distribution register 1810 receives from the memory 159 a telephone station address, it orders reading-out of the memories $180_{max}$, $180_{min}$ and $181_1$. The charge count C of the addressed station is equal to the number of charging pulses transmitted from the central office 2 to the telephone station during the observation time $\Delta T$ which has ended. The count C is compared with the three values $CMAX_n$, $CMIN_n$ and $C=1$, so as to produce a coded signal "faulty operation" of the public telephone station. This information relates to a signal for abnormally high traffic transmitted from the output of the comparator $180_{max}'$ when $C>CMAX_n$, to a signal for abnormally low traffic transmitted from the output of the comparator $180_{min}'$ and $C<CMIN_n$ and to a signal for nil traffic transmitted from the output of the comparator $180_1'$ when $C<1$. The signal $C=0$, when transmitted, indicates that it is impossible to connect the public telephone station to the central office 2 and that the station has been out of operation during the observation period $\Delta T$.

One of the three signals that indicate "faulty operation" is indicated by state "1" on the comparator output. The three inputs of the detector-encoder 182 are respectively connected to the outputs of the three comparators $180_{max}'$, $180_{min}'$ and $180_1'$. When the detector-encoder 182 detects a "1," it transmits to the buffer memories 170, 171 reading signals on a bus 1820 which order the transmission of the address words and parameter words $G_n$, $\overline{CMAX}_n$, $\overline{CMIN}_n$, $CMAX_n$, $CMIN_n$, $\Delta T_n$, FH, RD of the $G_n$ group from the output of the buffer memory 170 and the transmission of the address words and features words (S, C, $\overline{C}$) of the telephone station previously analysed and operating abnormally, from the output of the buffer memory 171. The detector-encoder 182 transmits a coded word corresponding to one of the three faulty-operation signals which is multiplexed in a multiplexing circuit 172 with the data words previously transmitted from the output of the buffer memories 170 and 171. All these data words suitably coded and multiplexed are transmitted from the output of multiplexing circuit 172 to a display device 173 and/or to terminal 3 by means of the transceiver 5 and the telephone channel 4 in order to be recorded locally and/or at a distance. Following another variant, the detector-encoder 182 may also transmit a "nothing to report" signal when no "1" is detected at the outputs of the comparators $180_{max}'$, $180_{min}'$, $180_1'$, in which case reading of memories 170 and 171 is directly ordered by processor 13 after receiving a signal on a wire 138, as shown in FIG. 4.

The detector-encoder 182 also transmits an analysis sequence end signal relating to the telephone station of the group $G_n$ previously analysed, to the processor 13 over the wire 138. This causes the zero-resetting (ZS) of the counter 11 associated with the station and of the buffer memory 171 by the processor 13. A new analysis sequence corresponding to the address of the following station of the group $G_n$ which is memorized in the station list memory block $159_n$, is analysed in accordance with the previous process, and so on. At the end of analysis of the last station of group $G_n$, the processor 13 resets the final hour register 1623 of the time recording circuit $162_n$, the buffer memories 170 and 171, the memories $180_{max}$ and $180_{min}$ in order to initialize a new observation period $\Delta T_n$ of the charge counts of the telephone stations assigned to the group $G_n$. It will be noted that the analysis duration of a group G is always less than the average spacing between two successive charging pulses which are counted in a charge counter $11_1$ to $11_M$.

It will also be noted that all the memories of the traffic analysing apparatus 1, except for the memory $180_1$, are random access memories, that is to say that they are controlled both in writing-in and in reading-out by the processor 13 on instructions given by the keyboard 14 or the terminal 3, for the purpose of modifying certain parameters. Such modification may be, for example, that of avarage traffic intensity values $\overline{C}$ of certain telephone stations as a function of their traffic evolution. A new classification phase of these stations in relation to the average traffic intensity limits ($\overline{CMIN}_1$, $\overline{CMAX}_1$) to ($\overline{CMIN}_N$, $\overline{CMAX}_N$) of the groups is carried out after having emptied the cells of list memory 159 which contain the addresses of these telephone stations. Orders may be given by the processor 13 at any moment for transmission in real time of the charge count C of one or of several charge counters 11, after comparison with the charge count comparison limits of groups to which they are assigned respectively in order to know the true operation state of one or of several of the telephone stations.

For this purpose, this type of direct analysis sequence is ordered directly by the processor 13 from the station address list memory 159.

A traffic analysing apparatus embodying the invention can supervise for example 48 public telephone stations which are connected to a common central office 2 and are distributed depending on their average traffic intensity values $\overline{C}$ over a 24 hour day, into five classification groups $G_1$ to $G_5$, defined by the following table:

| Group number | average traffic intensity limits $\overline{CMIN} \leq \overline{C} < \overline{CMAX}$ Charging pulse number/day | charge count comparisons limits C for a given $\Delta T$ | | observation period $\Delta T$ (hours) |
|---|---|---|---|---|
| | | CMIN (low traffic) | CMAX (high traffic) | |
| 1 | $200 \leq \overline{C} < 300$ | C < 80 | C > 900 | 24 |
| 2 | $100 \leq \overline{C} < 200$ | C < 30 | C > 600 | 24 |
| 3 | $70 \leq \overline{C} < 100$ | C < 40 | C > 800 | 48 |
| 4 | $35 \leq \overline{C} < 70$ | C < 15 | C > 650 | 48 |
| 5 | $0 \leq \overline{C} < 35$ | C < 5 | C > 400 | 72 |

As stated, the traffic analysing apparatus 1 analyses the charge counts relating to public telephone stations S which are served by a common telephone exchange 2. The maintenance terminal 3 such as an operating system is connected to suitable data recording medium designed to establish files to show the histograms of telephone stations during a long observation period. In the arrangement for remote traffice supervision shown in FIG. 5, the terminal 3 is located in a common maintenance centre for a number of telephone stations which are divided into local groups. Each local group is connected to a local telephone exchange $2_1$ to $2_I$ and is remote-analysed by a local traffic analysing apparatus $1_1$ to $1_I$. Each apparatus $1_1$ to $1_I$ is connected to the maintenance terminal 3 by a bidirectional telephone link $4_1$ to $4_I$ specialized or belonging to the telephone network.

This first organisation of a remote traffic monitoring system in accordance with the invention is designed preferably for public telephone stations in a trunk area in which a relatively high number of public telephone stations constituting a local group is served by the same telephone exchange 2.

The local display unit 173 of a traffic analysing apparatus 1 and preferably a central display device controlled by the maintenance terminal 3 may each comprises a display board such as a card that indicates, in the corresponding geographical location, the operation state of the public telephone stations in the local area or in the whole of the local and trunk areas. Three indicator lamps are placed at the geographic position of each telephone station on the board. Each of the three indicator lamps indicates, when lit up, one of the three respective features of "abnormal operation" defined by the charge count comparating circuit 180. This overall display also provides for localising activity zones of swindlers. Results of comparisons are thus interpreted by the maintenance and monitoring team as a function of previous observations and of previous traffic analyses, for example by means of a computer connected to terminal 3, depending on parameters $\Delta T$, CMAX and CMIN of groups to which public telephone stations are assigned. Results of comparisons may also be visualised in alphanumeric form by means of a printer or a display console included in the local display unit 173 or the maintenance terminal 3.

According to a second embodiment, the traffic analysing arrangement is organised as it is schematically illustrated by FIG. 6. This second embodiment corresponds to the case in which the plurality of public telephone stations are distributed in rural areas for which only a few public telephone stations, less than ten, are served by the same local exchange LE. In order to limit the cost of remote monitoring of a plurality of such local station groups, the charge counts are not analysed and accounted for locally.

As illustrated in FIG. 6, it is assumed that all the public telephone stations S are divided into three distant rural areas $A_1$, $A_2$ and $A_3$. Each area is served by a plurality of local distant telephone exchanges LE to each of which is connected a small number of public telephone stations S. A local transceiver LT concentrates monitoring of the stations served by the same local exchange LE and transmits the multiplexed charging pulses in real time over the same telephone link $4_L$ to a monitoring transceiver $MT_1$ to $MT_3$, through a distant main telephone exchange $ME_1$ to $ME_3$ forming the nodal point of the connected area $A_1$ to $A_3$. Other public telephone stations such as S' may be served directly by the main exchange $ME_1$ to $ME_3$ and may be connected to a local transceiver $LT_1'$ to $LT_3'$. Each monitoring transceiver MT counts the charging pulses relating to each public telephone station S served by a local exchange LE of the area A as well as the charging pulses of the stations S' served directly by the main exchange ME of the area A. The charge counts of all the stations in the area $A_1$ to $A_3$ are analysed by a central traffic analysing apparatus A which is localised at the nodal point of all the areas $A_1$ to $A_3$ and which may be very far from the main exchanges $ME_1$ to $ME_3$. This traffic analysing apparatus A is connected to a maintenance terminal 3. The telephone links $4_L$ between the local transceiver LT and the main exchanges $ME_1$ to $ME_3$ and the telephone links $4_M$ between the main exchanges $ME_1$ to $ME_3$ and the central traffic analysing apparatus A may be effected by special telephone lines which are only suitable for such communications or by telephone lines of the telephone network, in which case at least the monitoring transceivers MT and the apparatus A each have a device for automatically transmitting the receiving calls.

It thus appears that the remote traffic analysing arrangement illustrated in FIG. 6 has the same functions as those of traffic analysing apparatus 1 in accordance with the first embodiment. These functions are such that detection of charging pulses is performed in local transceivers LT, LT', the counting of charging pulses is performed in the monitoring transceivers MT and the traffic analysis itself relating to charge counts is performed by central traffic analysing apparatus A.

FIG. 7 illustrates schematically the structure and the organization of a local transceiver LT or LT'. Charge pulse detectors 10' are shown in it. They are connected to the charge wire pairs of the local exchange LE in a manner similar to FIG. 1 and each is associated with a public telephone station which is served by the local exchange LE. A register of local telephone station addresses 60 has its inputs which are connected to the outputs of the detectors 10' respectively. A register of the local exchange address 61 has its input which is connected to the outputs of the detectors 10' through an OR-gate 610. Each time that a charging pulse is detected by a charge pulse detector 10', the register 60 transmits on its output the telephone station address which is associated with the detector, and the register 61 transmits on its output the address of the local exchange LE. A multiplexer 62 multiplexes the two addresses to transmit them to a sending circuit 63 which is connected through the local telephone link $4_L$ to the corresponding main exchange ME. The sending circuit 63 encodes the multiplexed addresses into link code.

All the address pairs transmitted by the local transceivers LT and also by the transceiver LT' which are connected to the public telephone stations S' directly through the main exchange ME are multiplexed and decoded in a multiplexing and decoding circuit 70 of the monitoring transceiver MT, as shown in FIG. 8. The multiplexed addresses are transmitted to distributing circuit 71 which comprises a control unit 710, a local exchange address detector 711 and a telephone station address detector 712. The outputs of the detector 712 are connected to the counting inputs of a plurality of charge counters 11' which are similar to those shown in FIG. 1 and are each suitable for counting charging pulses of a telephone station of the common exchange area A served by the main exchange ME. The detector 711 comprises a local exchange address register and the detector 712 comprises telephone station address registers assigned to a local exchange LE excepting one alone which is assigned to addresses of stations P' served directly by the main exchange ME. Each time that the detector 711 detects the address of a local exchange LE or the address of the main exchange ME, it transmits an address signal towards the detector 712 to the address register of the stations connected to the exchange and the latter then transmits a pulse to the charge counter corresponding to the station address detected by the detector 712.

The outputs of the charge counters 11' of the monitoring transceiver MT are connected to a selecting circuit 181' which is similar to the selecting circuit 181 illustrated in FIG. 4. The distribution register of the selecting circuit 181' provides for selecting the charge counts of the counters 11' to be analysed when it receives a station address which is transmitted through the control unit 710 by the central apparatus A. The output of the circuit 181' transmits, when ordered by the apparatus A, the charge counts to a sending and receiving circiut 72 connected to the apparatus A through a bidirectional telephone link $4_p$. The circuit 72 comprises a modem and may comprise an automatic device for receiving and transmitting calls.

Each monitoring transceiver MT may also comprise a keyboard 14' to feed data locally to the control unit 710 and a local display unit 173' connected to the outputs of the charge counters 11' to locally display and monitoring the station charge counts of the local area A in real time.

The central traffic analysing apparatus A comprises, similarly to that 1 described in accordance with the first embodiment, a charge count processing unit $12_A$, a processor $13_A$ and a keyboard $14_A$, as shown in FIG. 6.

The processing unit $12_A$ may comprise, on the side of the trunks of its selecting circuit with transmission links $4_p$, an automatic device for transmission and reception of calls, preferably when links $4_p$ belong to the public telephone network.

Each station address list memory cell, such as 159 illustrated in FIG. 2, which is contained in the unit $12_A$, stores the addresses of the main exchange ME and the local exchange LE connected to the station, in addition to the address of the telephone station. When this station has to be analysed, the distribution register, such as 1810, illustrating in FIG. 4 and included in the selecting circuit of the unit $12_A$ of which the inputs are connected to the bidirectional telephone links $4_p$, transmits these last three addresses to the control unit 710 of the corresponding monitoring transceiver MT. After this transceiver detects its address in the sending and receiving circuit 72, it orders the count transmission from the charge counter 11' assigned to the station in question, through the control unit 710. The zero-setting (ZS) of each counter 11' and other auxiliary functions are remote-controlled by the central traffic analysing apparatus A.

Data transmission between the maintenance terminal 3 and the traffic analysing apparatus $2_1$ to $2_I$ shown in FIG. 5, or between the central traffic analysing apparatus A and the monitoring transceivers $MT_1$ to $MT_3$ may be effected as point-to-point communications or as multipoint communications through the telephone network.

Although the invention has been particularly shown and described with reference to the preferred embodiments thereof, it will be understood by those skilled in the art that the foregoing and other changes in form and details may be made therein without departing from the spirit and the scope of the amended claims. Thus, it will be noted, that instead of distributing the telephone stations in groups such as $G_1$ to $G_N$, for the purpose of analysing their traffic, the arrangement may comprise, in accordance with other variants, time recording circuits which initiates the charge count analysis, respectively and separately. In this case, most of the components contained in the telephone station distributing circuit 15 such as, mainly, comparators 155 and 156 and the telephone station address list memory 159, illustrated in FIG. 2, are eliminated.

What we claim is:

1. A traffic analysing arrangement for public telephone stations which are served from a telephone exchange equipped to transmit charging pulses to said telephone stations through telephone subscriber's lines, said arrangement comprising:

means connected in parallel to each telephone line or telephone line input means of said telephone exchange for detecting charging pulses during telephone calls requested by a telephone station connected to said telephone line;

means connected to said charging pulse detecting means for periodically counting the number of detected charging pulses during a predetermined observation period allocated to said telephone station;

time recording data delivering means for periodically reading-out the charging pulse number in said counting means and for resetting said counting means after said predetermined observation period;

means connected selectively to said charging pulse counting means for comparing said charging pulse number to at least two predetermined charging pulse number values specific to said telephone station at the end of each predetermined observation period allocated to said telephone station; and coding means connected to said comparing means for producing a coded signal indicating an operation failure of said telephone station when the charging pulse number is greater than one or less than the other of said predetermined charging pulse number values specific to said telephone station.

2. A traffic analysing arrangement as in claim 1, wherein said comparing means also compares said charging pulse number to the number one so that said coding means produces a coded signal indicating that said telephone station is out of service when said charging pulse number is zero.

3. A traffic analysing arrangement as in claim 1 wherein said coding means produces a coded signal indicating that said telephone station is operating normally when said charging pulse number lies between said two predetermined charging pulse number values.

4. A traffic analysing arrangement as in claim 1, comprising means controlled by said time recording means for transmitting the address of said telephone station, said read-out charging pulse number and the coded signal indicating the operation state of said telephone station to displaying means, in response to a coded signal produced from said coding means.

5. A traffic analysing arrangement for public telephone stations which are served from a telephone exchange equipped to transmit charging pulses to said telephone stations through telephone subscriber's lines, said arrangement comprising:

means connected in parallel to each telephone line or telephone line input means of said telephone exchange for detecting charging pulses during telephone calls requested by a telephone station connected to said telephone line;

means connected to said charging pulse detecting means for periodically counting the number of detected charging pulses during a predetermined observation period allocated to said telephone station;

means for storing the address of each telephone station, two predetermined charging pulse number values specific to said telephone station and a predetermined observation period duration allocated to said telephone station;

time recording means connected to said storing means for determining the end of each observation period and, in response thereto reading-out the charging pulse number in said counting means and then resetting said counting means;

means responsive to reading-out of said charging pulse number for comparing said charging pulse number to said two stored predetermined charging pulse number values specific to the telephone station;

coding means connected to said comparing means for producing a coded signal indicating an operation failure of said telephone station when the charging pulse number is greater than one or less than the other of said predetermined charging pulse number values and for producing another coded signal indicating the normal operation state of said telephone when the charging pulse number lies between said two predetermined charging pulse number values; and means connected to said storing means for changing said predetermined charging pulse number values and said observation period of any telephone station when the average number of changes over a predetermined time to said telephone station has undergone a significant change; and means for displaying the result of said number comparisons in response to a further coded signal transmitted by said coding means.

* * * * *